Dec. 15, 1970  J. H. CARLSON  3,546,959
DIMENSIONALLY STABILIZED GEARS
Filed Oct. 11, 1968  2 Sheets-Sheet 1

Inventor
John H. Carlson
By his Attorney
Carl E. Johnson.

Dec. 15, 1970        J. H. CARLSON        3,546,959
DIMENSIONALLY STABILIZED GEARS
Filed Oct. 11, 1968                    2 Sheets-Sheet 2

United States Patent Office 3,546,959
Patented Dec. 15, 1970

3,546,959
DIMENSIONALLY STABILIZED GEARS
John H. Carlson, 15 Bradley Road,
Danvers, Mass. 01923
Filed Oct. 11, 1968, Ser. No. 766,836
Int. Cl. B21d 53/28; F16h 55/12
U.S. Cl. 74—439                                    3 Claims

ABSTRACT OF THE DISCLOSURE

A molded gear of thermoplastic material such as an acetal is made dimensionally stable, rigid and precise both during its construction and during its use by incorporating a stiff ring for instance of sintered iron. The wholly, or almost wholly, embedded ring is encapsulated by the plastic during initial formation and the resultant gear thereafter retains its precise shape with greater rigidity and dimensional stability over a wide temperature range. An especially valuable application of the invention is in the circular spline of a harmonic drive actuator since the spline teeth are often small, numerous and maintenance of their exactly circular disposition is relied on for precision performance in positioning devices.

BACKGROUND OF THE INVENTION

This invention relates to gearing, especially circular gears and splines of a plastic material which are to be relied on for precision performance and durability over a wide variation in operating torque load and over a wide range of temperature. Composite metal-plastic wheels and gears have hitherto been provided for various mechanisms, commonly being employed in low cost applications where only low torque is involved and/or precision is not significant. In these earlier combinations the metal has customarily served as a central hub or exposed core, or been used as a wire or thin reinforcing band thus to cause the plastic material approximately to hold only a generally round shape. Where operation of a gear under conditions of variable load and temperature has been contemplated, and especially where precision in operation has been important, reliance only upon high quality metals and the complete exclusion of plastic has been the invariable practice, careful allowances being made for the coefficient of expansion of the particular metal used. The cost of such gearing where a high order of precision is required is great and the problem of dimensional change due to temperature variation nevertheless remains.

For optimum performance from a harmonic drive actuator, as with other circular gears, its circular spline should under all operating torque conditions retain its configuration as a true circle. The modulus of elasticity of a stabilizing ring can be as much as one hundred times that of a plastic, and hence usage of the ring can attain marked increase in rigidity. Accordingly the harmonic drive element usually termed a wave generator, for radially deflecting a flexspline and causing progressive circumferential tooth engagements with the circular spline, is normally of steel or some other ferrous metal. In order to insure that under extreme temperature conditions the relationship between the flexspline teeth and the circular spline teeth will remain essentially constant, a circular spline partly of plastic and properly incorporating a stabilized ring of the same ferrous material as in the wave generator, i.e. having a comparable coefficient of thermal expansion, is provided.

SUMMARY OF THE INVENTION

In view of the foregoing it is a primary object of this invention to provide a composite, economical gear insuring good dimensional stability both during its precision manufacture and in subsequent actual operation.

A further object resides in the provision of an improved method for making a dimensionally stable and rigid composite gear, especially a harmonic drive circular spline.

To these ends a stabilizing circular ring, preferably of steel or of sintered iron, is positioned in a mold, the ring being essentially uniform and of sufficient cross section to remain circular and planar under the molding pressure, and placed with a surface thereof close to and evenly spaced from the circular series of gear teeth or splines to be formed, whereupon a heated thermoplastic such as an acetal is introduced under pressure into the mold cavity and entirely, or almost entirely, encircles and envelops the ring. The resultant composite gear may have evry finely formed teeth and other refined details in its configuration, its exact required shape will have been promptly established, and dimensional stability of the unit during use and thermal excursions will be found to be far superior to the corresponding product formed solely of plastic.

BRIEF DESCRIPTION OF THE DRAWINGS

The above and other features of the invention will now be more particularly described in connection with embodiments selected for purposes of illustration and with reference to the accompanying drawings.

Figure 1:
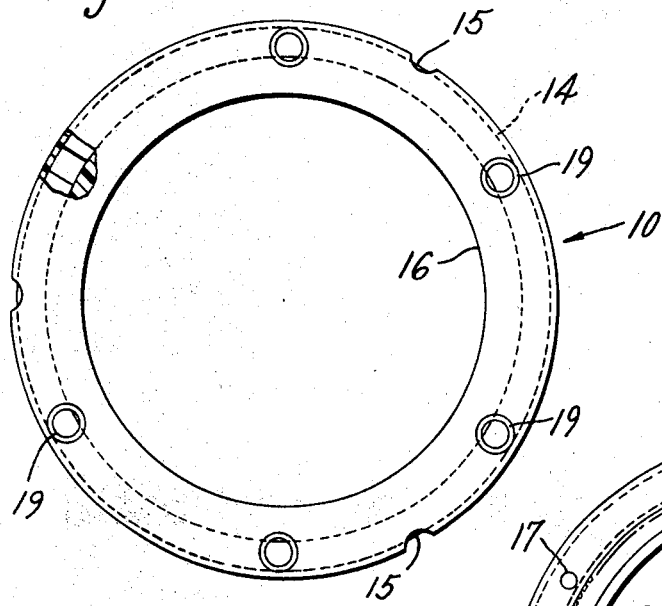
FIG. 1 is a bottom view, with a portion broken away, of a ring gear stabilized dimensionally in accordance with this invention.
Figure 2:
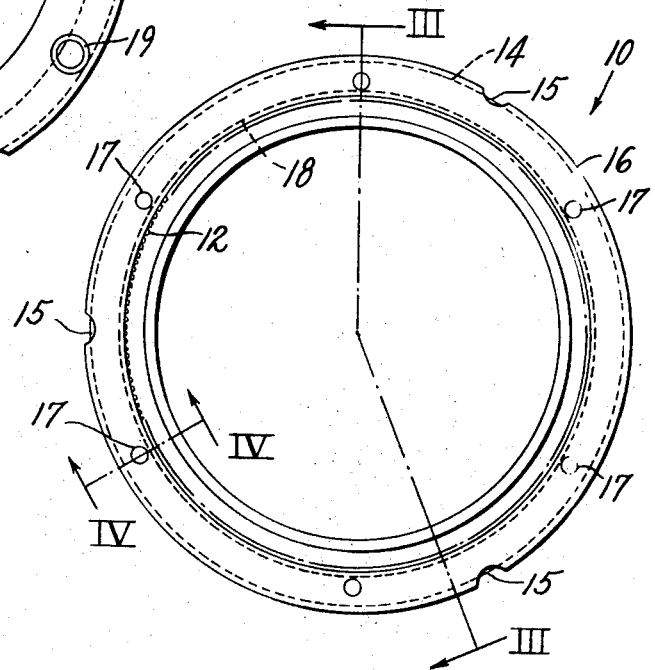
FIG. 2 is a plan view of the gear shown in FIG. 1.
Figure 3:
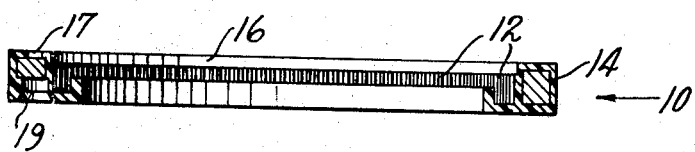
FIG. 3 is a section taken on the broken line III—III of FIG. 2.
Figure 4:
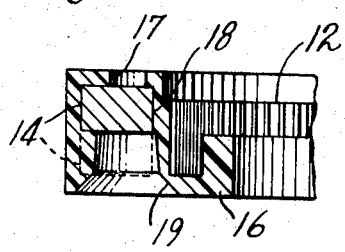
FIG. 4 is an enlarged section taken on the line IV—IV of FIG. 2.
Figure 5:
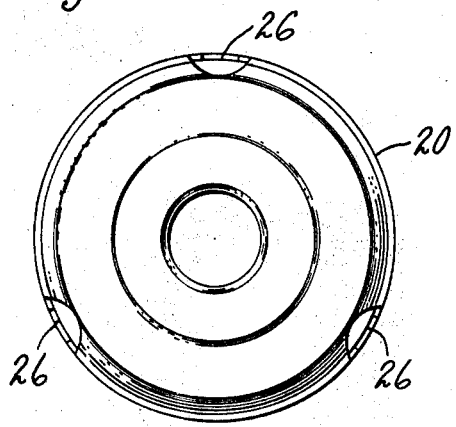
FIG. 5 is a rear view of a composite housing embodying my invention.

It will be appreciated that the invention may be employed in a large variety of differently shaped members formed with circular gear teeth or spline teeth. A composite ring gear generally designated 10 (FIGS. 1 and 2) will first be described by way of illustration. This gear, having a tooth circle diameter on the order of 4", for instance, is the torque reaction member in a harmonic drive type reducer and meshes at circumferentially spaced localities with a flexspline (not shown) for use, for instance, in an azimuth antenna drive. The gear 10 accordingly has a large number of precision spline teeth 12 (FIG. 2), in this case disposed internally, for angularly orienting a remote controlled antenna. In order that, regardless of temperature variation due to operation of the mechanism or due to external conditions, the gear 10 may initially be formed with dimensional exactness and this "built in" precision maintained during subsequent service, a manufacturing technique is followed as next explained.

A metal ring 14 having a uniform (in this case rectangular) cross section of great rigidity is provided. The ring 14 preferably has a circumferential surface 18, in this instance internal, to be disposed a small but uniform distance from the roots of the spline teeth 12 subsequently to be formed by molding. Preferably the ring is preheated to a temperature selected to retard and control the rate of plastic solidification during molding, for instance an initial heat sink temperature of about 100° below that of the molten plastic. Equispaced positioning pins (not shown) accordingly project into a mold cavity for respectively engaging the ring 14 radially and axially thereby accurately locating the ring and maintaining its position in the mold cavity and embedded relative to the plastic surfaces to be formed in the composite gear 10. The position of the ring and its heat sink temperature is such that the material 16 is promptly set and envelops the ring entirely except for small localities 15, 17 and 19 where the ring is contacted by its positioning pins. Upon removal from the mold the ring 14 will be exposed only in these small localities so that the gear 10 otherwise appears to be wholly of plastic.

In FIG. 5–8 inclusive there is illustrated a cup-shaped housing 20 molded of a thermoplastic such as acetal and having embedded therein a steel ring 22. The latter closely surrounds and axially is substantially coextensive with circumferential spline teeth 24 molded in the plastic. As in the embodiments shown in FIGS. 1–4 inclusive the ring 22 occupies a fairly large volume of space relative to the volume of the plastic surrounding it, and thereby dimensionally stabilizes the precisely formed teeth 24. The rigidity of the ring 14 or 22 per se (and of their respective assemblies) is attained by providing that the ring thickness as measured in a radial direction shall be not less than about ten percent of the neutral axis diameter of the ring.

Figure 6:
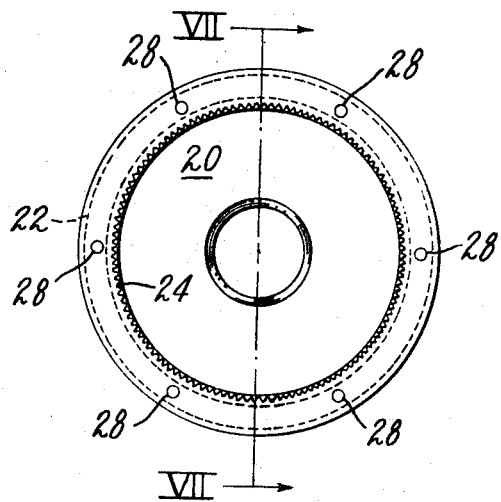
FIG. 6 is a front view of the housing shown in FIG. 5.
Figure 7:
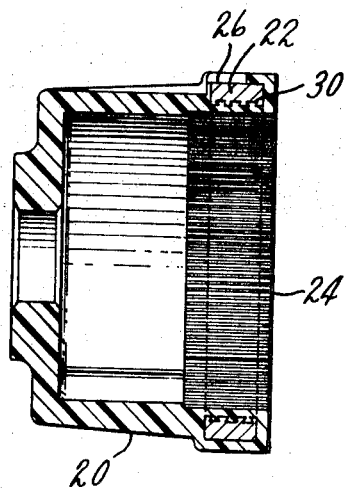
FIG. 7 is an axial section taken on the line VII—VII of FIG. 6.
Figure 9:
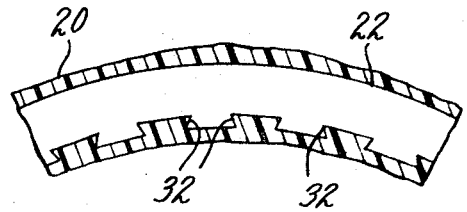
FIG. 9 is a transverse section of a portion of a circular spline shown in FIGS. 7 and 8, but modified to include an alternate form of means for radially interlocking its ring and plastic.
Figure 8:
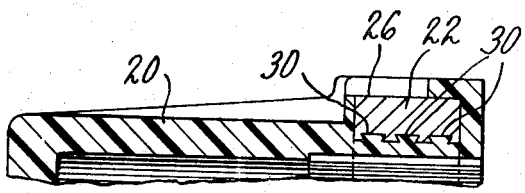
FIG. 8 is an enlarged detail view of a portion of the housing shown in FIG. 7.

The ring 22 is positioned axially within the mold by three jaws (not shown) which consequently leave the ring exposed in small circumferential localities 26, and by cooperating pins causing ring face exposures at 28 (FIG. 6). In order during setting of the plastic to prevent formation of an air gap between the inner periphery of the ring 22 and the adjacent plastic in which the teeth 24 are molded, the ring 22 is formed with circumferential dovetail locking grooves 30 (FIG. 8) for receiving the plastic. Alternatively, as shown in FIG. 9, dovetail grooves 32 may extend axially of a ring to radially lock the plastic against radial relative movement.

The illustrative composite gearing described above is unique not because its plastic has been reinforced by a metal element since mere strengthening of plastic articles by bands and/or wire has hitherto been known; its uniqueness resides in the attainment, in addition to durability, of a dimensional precision in the gear as initially produced plus the notably superior characteristic of being able to maintain their exact dimensions in the subsequent operation of the gearing despite being subjected to a wide range of temperature. Moreover this performance is obtained at a lower cost than possible with all-metal gearing. The placement of rings 14 or 22 in their molds in a position where they are uniformly and closely spaced relative to the critical teeth to be formed, and where the ring masses can function as internal stiffening means almost wholly within the plastic insures that they will thereby produce both dimensional precision and dimensional stability in the gears.

Numerous additional examples of my composite gear will be recognized as possible and desirable. The two herein described are selected since they have received extensive trial and been remarkably successful in harmonic drive type actuators wherein, in addition to being subjected to the usual gearing dynamics, they have cooperated with the circumferential wave of radial deflection and attending stresses inherent in flexsplines. Their ability to closely maintain their dimensions "as constructed" during subsequent operating performance, despite thermal excursions, insures that positioning results will be enhanced. This is to say that without the stabilizing ring to control a circular spline diameter under temperature extremes, a wholly plastic circular spline, having a coefficient of thermal expansion essentially ten times greater than steel, would expand a greater amount than a ferrous wave generator thus causing an improper tooth fit and thereby degrade precision performance. Expansion and contraction of the circular splines as herein disclosed occur at the same rate as would a metal wave generator (assuming the ring 14 or 22 and the wave generator are of the same metal); hence the rings control pitch diameter and proper meshing is insured over a wide temperature range.

Having thus described my invention, what I claim as new and desire to secure by Letters Patent of the United States is:

1. A composite gear comprising a molded thermoplastic having a circumferential set of teeth, and a single stiff non-perforated metal ring wholly or almost wholly embedded in the plastic, a circumferential surface of the ring being positioned uniformly close to the roots of the teeth, the ring thickness measured in the radial direction being not less than about 10% of the neutral axis diameter of the ring thereby maintaining dimensional stability of the gear both during its formation and subsequent use.

2. The method of making a dimensionally stable plastic gear comprising providing a mold cavity having a circular series of teeth, disposing within the cavity closely and uniformly adjacent to the roots of the teeth to be formed a heat sink in the form of a preheated stiff metal ring of uniform cross section, introducing a thermoplastic under pressure into the mold at a temperature above the heat sink temperature of the ring to wholly or almost wholly embed the ring, and lastly, following the set of the plastic at a retarded rate controlled by the mass of the ring, removing the composite gear from its mold.

3. A dimensionally stable composite circular spline for reacting the circumferential wave of radial deflection in a harmonic drive transmission, the spline comprising a thermoplastic having its set of circumferential spline teeth molded therein, and a stiff imperforate steel ring of uniform cross section having a circumferential surface spaced uniformly and closely adjacent to the roots of said circular spline teeth, said circumferential surface of the ring being substantially axially coextensive with said spline teeth, the ratio of the radial thickness of the ring to its neutral axis diameter being not less than about 10%, and the thermoplastic almost entirely enveloping the ring.

References Cited
UNITED STATES PATENTS

| | | | |
|---|---|---|---|
| 1,427,892 | 9/1922 | Aiken | 74—443 |
| 2,955,481 | 10/1960 | Jackel | 74—438 |
| 3,076,352 | 2/1963 | Larsh | 74—443 |
| 3,225,615 | 12/1965 | Little | 74—416 |

LEONARD H. GERIN, Primary Examiner

U.S. Cl. X.R.

29—159.2

PO-1050
(5/69)

UNITED STATES PATENT OFFICE
CERTIFICATE OF CORRECTION

Patent No. 3,546,959            Dated December 15, 1970

Inventor(s)    John H. Carlson

It is certified that error appears in the above-identified patent and that said Letters Patent are hereby corrected as shown below:

Column 1, in title of patent after 01923 should be inserted; -Assignor to USM Corporation, Flemington, N.J. a Corporation of New Jersey-.

Signed and sealed this 23rd day of March 1971.

(SEAL)
Attest:

EDWARD M. FLETCHER, JR.
Attesting Officer

WILLIAM E. SCHUYLER, J
Commissioner of Patent